United States Patent
Maisch

(10) Patent No.: US 11,424,476 B2
(45) Date of Patent: Aug. 23, 2022

(54) COUNTERHOLDER FOR SUPPORTING AT LEAST ONE OF TWO BOUNDARY SURFACES, BETWEEN WHICH A MEDIUM IS ARRANGED

(71) Applicant: AUDI AG, Ingolstadt (DE)

(72) Inventor: Michael Maisch, Rottenburg (DE)

(73) Assignee: AUDI AG, Ingolstadt (DE)

( * ) Notice: Subject to any disclaimer, the term of this patent is extended or adjusted under 35 U.S.C. 154(b) by 321 days.

(21) Appl. No.: 16/682,433

(22) Filed: Nov. 13, 2019

(65) Prior Publication Data
US 2020/0153031 A1 May 14, 2020

(30) Foreign Application Priority Data
Nov. 14, 2018 (DE) .......................... 102018219462.9

(51) Int. Cl.
| | | |
|---|---|---|
| *H01M 10/04* | (2006.01) | |
| *H01M 10/6567* | (2014.01) | |
| *H01M 10/613* | (2014.01) | |
| *H01M 10/6556* | (2014.01) | |
| *H01M 10/6554* | (2014.01) | |
| *H01M 10/653* | (2014.01) | |

(52) U.S. Cl.
CPC ..... *H01M 10/0481* (2013.01); *H01M 10/613* (2015.04); *H01M 10/6567* (2015.04); *H01M 10/653* (2015.04); *H01M 10/6554* (2015.04); *H01M 10/6556* (2015.04); *Y02E 60/10* (2013.01); *Y02P 70/50* (2015.11)

(58) Field of Classification Search
CPC .......... H01M 10/0481; H01M 10/613; H01M 10/653; H01M 10/6554; H01M 10/6556; H01M 10/6567; Y02E 60/10; Y02P 70/50
See application file for complete search history.

(56) References Cited

U.S. PATENT DOCUMENTS

2014/0010995 A1\* 1/2014 Casasanta, III .......... B05D 5/12
156/60

FOREIGN PATENT DOCUMENTS

| DE | 102016109931 A1 | 11/2017 |
|---|---|---|
| DE | 102017201692 A1 | 8/2018 |

OTHER PUBLICATIONS

German Examination Report dated Jul. 26, 2019 in corresponding German Application No. 10 2018 219 462.9; 24 pages; Machine translation attached.

\* cited by examiner

*Primary Examiner* — Lingwen R Zeng
(74) *Attorney, Agent, or Firm* — Maier & Maier, PLLC

(57) ABSTRACT

A counterholder for supporting at least a first of two boundary surfaces, between which a medium is arranged, via which a first compressive force acting on the first boundary surface and a second compressive force acting on the second boundary surface and directed counter to the first compressive force are exerted, at least temporarily. The counterholder has a shell of elastically deformable design at least in one contact area for positioning at a boundary element, which provides the first boundary surface on a contact side opposite the first boundary surface, and within which, a non-Newtonian, shear-thickening fluid is arranged.

7 Claims, 1 Drawing Sheet

COUNTERHOLDER FOR SUPPORTING AT LEAST ONE OF TWO BOUNDARY SURFACES, BETWEEN WHICH A MEDIUM IS ARRANGED

FIELD

The disclosure relates to a counterholder for supporting at least a first of two boundary surfaces, between which a medium is arranged, and via which, a first compressive force acting on the first boundary surface and a second compressive force acting on the second boundary surface and directed in an opposite direction of the first compressive force are exerted at least temporarily. The disclosure also includes a method for supporting at least a first of two boundary surfaces.

Batteries or battery modules known from the prior art are usually placed on a cooling device, whereby between this cooling device and one side of the respective battery modules, usually a so-called gap filler is present, e.g., a heat-conducting paste, in order to close air gaps between the module sides and the cooling device, as such air gaps impairs heat dissipation.

In this context, DE 10 2016 109 931 A1 describes a cooling device and a method for thermally connecting an energy storage device to a cooling device with a cooling plate, wherein a thermally conductive heat conducting foil and a thermally conductive filling layer are placed on the cooling plate and the energy storage device is positioned on the filling layer.

In order to arrange such a gap filler between a cooling device and the battery module, generally the gap filler is first applied on one side of the cooling device, e.g., a cooling plate, whereupon the battery module is placed on the gap filler and pressed in the direction of the cooling plate, such that this gap filler is preferably evenly distributed between the cooling plate and the battery module due to the displacement caused by this contact force, thereby wetting preferably completely the cooling plate surface and the side of the battery module facing the surface of the cooling plate.

When a medium, e.g., a liquid or a gap filler of this kind, is displaced between two surfaces, the pressure in the cavity causes these surfaces to deform. However, such a deformation is undesirable, in that under certain circumstances it may cause damage to the components, e.g., the cooling plate or the module housing base, and also increase the gap to be filled with the gap filler entailing disadvantages in terms of material expenses, costs, weight and heat dissipation. Such deformation is therefore preferably reduced or completely avoided.

SUMMARY

The object of the present invention is thus to provide a counterholder and a method for supporting at least a first of two boundary surfaces, between which a medium is arranged, which allow for reducing or avoiding the deformation of at least the first boundary surface, due to this first compressive force.

A counterholder according to the invention for supporting at least a first of two boundary surfaces, between which a medium is arranged, via which a first compressive force acting on the first boundary surface and a second compressive force acting on the second boundary surface and directed in a direction opposite to the first compressive force are exerted at least temporarily, has a shell of an elastically deformable design on an contact side opposite the first boundary surface at least in one contact area for positioning at a boundary element providing the first boundary surface, and within which shell, a non-Newtonian, shear-thickening fluid is arranged.

Such a shear-thickening or dilatant fluid, in particular a liquid, is characterized in that its viscosity increases with high temporal shear changes. This now makes it advantageous for the counterholder to be advanced slowly toward the boundary surface to be supported or its opposite contact side and to adhere to the surface of this opposite side. If, however, the force for the medium displacement process is initiated in order to distribute the medium between the two boundary surfaces, this fluid hardens, i.e., the fluid is becomes hard, thus preventing deformation of the boundary surface. Other counterholders, such as those provided by rigid solids, which are already stiff and used to support such a surface, have the great disadvantage of not adapting particularly well to the surface geometries of the surface to be supported or the side opposite thereof. Even small deviations from this surface geometry, such as gaps or other clearances cause the respective boundary surface to be unevenly supported, which causes stresses to be initiated, which inevitably leads to the boundary surfaces springing back, when removing such a counterholder, at least if the medium is not a type of cured adhesive, whereby the desired wetting of the boundary surfaces cannot be ensured. This can now advantageously be avoided, in that the counterholder according to the invention, when positioned on the surface to be supported, may be optimally adapted to the surface geometries of the surface to be supported, due to its low viscosity and absent a high temporal change of shear, and when initiating the force for the liquid or medium displacement process, by applying a corresponding counterforce, almost like a rigid body, due to a change or almost sudden increase in the viscosity of the first compressive force acting in the direction of the first boundary surface. This advantageously allows for setting minimum gaps between two boundary surfaces, between which the medium is to be arranged and distributed, without bringing these surfaces out of their tolerance position, and without the desired wetting subsequently being prevented by springback.

The counterholder is preferably completely filled with the non-Newtonian fluid. Consequently, the efficiency of the counterholder may be maximized. A simple and known example of a non-Newtonian, dilatant fluid is a starch slurry of starch and water. However, there are many more possible ways of providing such a fluid, especially with the desired properties described below.

In a further advantageous embodiment of the invention, the non-Newtonian fluid is formed such that with preset slow positioning of the counterholder on the boundary element providing the first boundary surface on the contact side opposite the first boundary surface, a surface shape of the contact area may be adapted to a surface shape of the contact side, and with a preset rapid increase of the first compressive force to its maximum value when initiating a distribution process for distributing the medium between the first and second boundary surfaces, the non-Newtonian fluid solidifies at least temporarily.

Thus, when the counterholder is arranged slowly on the contact side, the fluid is not exposed to any shear forces, which are subject to great temporal changes, such that the fluid has a very low viscosity, which allows the contact area to be adapted to or fitting into the surface shape of the contact side. If, for example, the medium located between the boundary surfaces is distributed by displacement, then the requisite forces are increased quickly such that the first compressive force acting on the first boundary surface increases quickly to its maximum value such that the fluid is exposed to shear forces with a high temporal change, which cause a significant increase in the viscosity of the fluid, thereby solidifying the fluid. As a result, the counterholder, which is now ideally adapted to the surface geometry of the side to be supported, may optimally support this side in its solidified state.

Preferably, the non-Newtonian fluid is also a reversibly dilatant fluid, e.g., a reversibly dilatant fluid. This means that the viscosity of the fluid again decreases, especially to its original value, after the shear force has been reduced, only after a certain time, as the case may be. Hence, the counterholder device is advantageously reusable.

Furthermore, the invention relates to a method for supporting at least a first of two boundary surfaces, between which a medium is arranged, and via which a first compressive force acting on the first boundary surface and a second compressive force acting on the second boundary surface and directed counter to the first compressive force are exerted at least temporarily. Thus, a counterholder having a shell of an elastically deformable design is provided at least in one contact area for positioning on a contact side of a boundary element providing the first boundary surface opposite the first boundary surface, within which shell a non-Newtonian, shear-thickening fluid is arranged. Furthermore, the counterholder is arranged slowly on the boundary element providing the first boundary surface on the contact side opposite the first boundary surface, such that a surface shape of the contact area of the counterholder adapts to a surface shape of the contact side of the boundary element. Moreover, the medium is distributed between the first and second boundary surfaces, as the first and second compressive force are generated, whereby the distribution or the distribution process is initiated, such that the first compressive force acting on the first boundary surface increases rapidly to its maximum value during such initiation, whereby the non-Newtonian fluid solidifies at least temporarily.

The said advantages for the counterholder according to the invention and its embodiments apply similarly to the method according to the invention.

In a further advantageous embodiment of the method according to the invention, the non-Newtonian fluid solidifies at least temporarily, when the distribution is initiated, such that a counterforce opposing the first compressive force, in particular of the same size, is exerted on the contact side by the counterholder, thereby preventing deformation of the first limiting element in the direction of the first compressive force. In this state of the fluid with the increased viscosity, the fluid may be regarded as almost a solid, in particular as a rigid or stiff solid. The amount of deformation may therefore be reduced, and furthermore, such deformation may be completely prevented.

A further advantageous embodiment of the method additionally provides a second counterholder for supporting the second boundary surface, which counterholder is arranged on a second contact side of a second boundary element, which also provides the second boundary surface, wherein the second contact side is arranged opposite the second boundary surface, before the distribution of the medium is initiated. Thus a deformation of the second boundary surface may be advantageously prevented in a similar fashion or at least its extent significantly reduced.

This is particularly advantageous if the first and/or second boundary surface is provided by a corresponding boundary element, which is relatively thin-walled, such that it can be easily deformed under the application of a force. In this way, both boundary surfaces can be supported particularly advantageously. The second counterholder may be designed in the same way as the counterholder described above, and which is used to support the first boundary surface.

Furthermore, a boundary element providing the second boundary surface is preferably pressed in the direction of the first boundary surface in order to distribute the medium. Such pressing of the second boundary surface toward the first boundary surface in order to distribute the medium may be effected by applying a suitable compressive force to the boundary element providing the second boundary surface in the direction of the first boundary surface. Such pressing represents a particularly simple way of distributing a medium situated between the two boundary surfaces as homogeneously as possible between the two boundary surfaces and thereby maximizing the degree of utilization of either boundary surface.

It is furthermore particularly advantageous if the first boundary surface is provided by a battery housing and/or a cooling device for cooling a battery, in particular a high-voltage battery, and the second boundary surface is provided via one side of a battery module, in particular the high-voltage battery. Especially in the case of distributing as evenly as possible a gap filler for an application, such as a thermal conduction component, particularly a heat-conducting paste, between a battery module and the module housing and/or a cooling device, such as a cooling plate with a flow-through cooling medium, the described method, and in particular also the counterholder according to the invention and its embodiments, provide huge advantages. This is because the invention and its embodiments allow for a battery module to be particularly efficiently connected to a cooling device. This is due to the fact that due to the counterholder the gap width between the battery module and the cooling device, which is filled by the gap filler, may be kept particularly small in that deformation is particularly efficiently avoided, which is made possible by the invention. This results in a particularly advantageous heat dissipation effect, and also allows for very homogeneous heat dissipation over the entire boundary surface, in addition to saving an inordinate amount of material and hence costs.

Accordingly, it is likewise advantageous, when a heat-conducting fluid or a heat-conducting paste, such as a heat-conducting suspension, is distributed as a medium between the first and second boundary surfaces. Especially the combination with the counterholder according to the invention or its embodiments or the combination with the method according to the invention or its embodiments particularly advantageously allows for highly efficient heat dissipation from the second boundary surface via the heat-conducting fluid or the heat-conducting paste to the first boundary surface or the reverse, in that the Invention and its embodiments allow for a particularly uniform distribution of such a heat-conducting fluid or heat-conducting paste as a particularly thin and uniformly thick layer.

In addition, the subject features mentioned in connection with the counterholder according to the invention and its embodiments also make it possible to further develop the method according to the invention by means of further corresponding method steps and vice versa.

The disclosure also includes combinations of the features of the described embodiments.

BRIEF DESCRIPTION OF THE DRAWINGS

Below follows a description of embodiments of the invention. In the figures.

DETAILED DESCRIPTION

Figure 1:
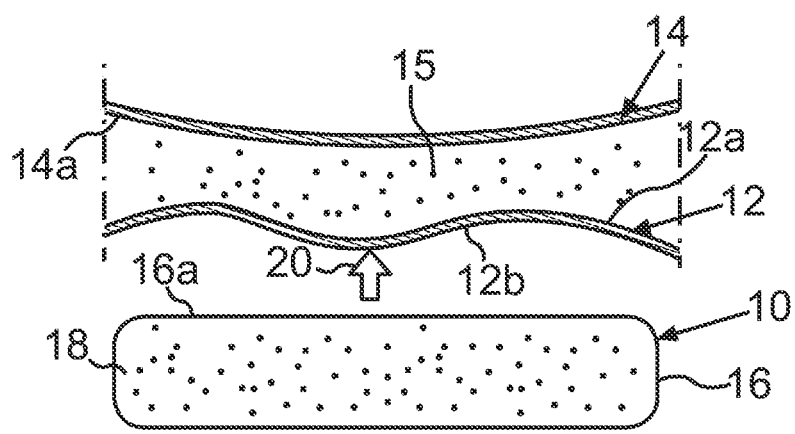
FIG. 1 is a schematic representation of a counterholder for supporting a first of two boundary surfaces, between which a medium is arranged, according to an embodiment of the invention.

The exemplary embodiments explained below represent preferred embodiments of the invention. In the exemplary embodiments, the described components of the embodiments each represent individual features of the invention, which are to be considered independently of one another, and which further develop the invention independently of one another. Thus, the disclosure should also include combinations of features of the embodiments in addition to those described. Furthermore, the described embodiments may also be supplemented by already described additional features of the invention.

In the figures, identical reference numerals denote functionally equivalent elements.

FIG. 1 is a schematic representation of a counterholder referred to below as a counterholder 10 for supporting one of two boundary surfaces 12*a*, 14*a*, in this case, supporting the first boundary surface 12*a*, which is provided by a first boundary element 12, according to an embodiment of the invention. In this illustration, which is in particular a schematic cross-sectional representation, the counterholder 10 has yet to be arranged on the first boundary element 12 in order to support the first boundary surface 12*a*. The second boundary surface 14*a* may be provided in similar fashion by a second boundary element 14. The side of the first limiting element 12 opposite the first boundary surface 12*a* represents a first contact side 12*b*.

The first boundary element 12 may constitute, e.g., a cooling device for cooling a battery, which may be designed, e.g., as a cooling plate through which a cooling medium may flow. The boundary element 12 may also represent only one housing base of a battery housing, upon which a cooling device may be arranged in subsequent assembly steps. The second boundary element 14 may represent, e.g., one side of a battery module. In order to enable optimal thermal connection of such a battery module on the cooling device, so-called gap fillers are usually arranged between one side of the battery module, in this case the second boundary surface 14*a*, and one side of the cooling device, in this case the first boundary surface 12*a*.

Such a medium, e.g., the described gap filler, is also shown in FIG. 1 as arranged between the two boundary surfaces 12*a*, 14*a* and designated by numeral 15.

Such gap fillers may be more or less viscous, thermally conductive liquids or pastes, e.g., a suspension. Generally, such gap fillers are relatively viscous and may be distributed by means of displacement only by high forces, e.g., by squeezing together both boundary surfaces 12*a*, 14*a*. Since such contact forces usually cannot be applied in a homogeneously distributed fashion over the respective boundary surfaces 12*a*, 14*a*, but instead are applied at discrete points, this usually leads to deformation of the respective boundary surfaces 12*a*, 14*a*, or at least areal deformation of the boundary elements 12, 14, e.g., in the shape of a curvature to the outside, i.e., away from the medium 15. At worst, this again may cause damage to the respective components, e.g., the cooling device or battery module, however, at least give rise to very non-homogeneous and large gap widths between the two boundary surfaces 12*a*, 14*a*, with a huge effect especially on heat dissipation. By means of the counterholder 10 described below, such a deformation may advantageously be avoided or its extent at least greatly reduced.

In this case, the counterholder 10 has a shell 16. This shell 16 is of an elastically deformable design at least in one contact area 16*a* for positioning at the contact side 12*b* opposite the first boundary surface 12*a*. Generally, however, the shell 16 may also be designed to be elastically deformable in other areas, in particular, it may also be formed entirely from an elastically deformable material, e.g., as an elastically deformable bladder. Suitable materials include artificial or natural polymers, in particular elastomers. This shell 16 of the counterholder stages is now advantageously filled with a non-Newtonian, shear-thickening or dilatant fluid 18, e.g., a non-Newtonian liquid. Absent any great temporal changes in the shear forces acting in fluid 18, this fluid 18 has a relatively low viscosity, as illustrated in FIG. 1 by the dotted representation of the fluid 18. This counterholder 10 may thus be arranged in a similarly slow manner on the contact side 12*b*, as illustrated by the arrow 20. If the counterholder 10 is thus pressed similarly slowly against this contact side 12*b*, whereby the contact area 16*a* of the counterholder 10 fits snugly against the shape of the uneven contact side 12*b* of the boundary element 12, such that the contact area 16*a* of the shell 16 is in complete contact with the contact side 12*b* of the boundary element 12. This is shown schematically in FIG. 2.

FIG. 2 again is a schematic cross-sectional view of counterholder 10 in a position arranged on the contact side 12*b*. If now the medium 15 located between the two boundary surfaces 12*a*, 14*a*, e.g., the gap filler, is to be distributed as evenly as possible by applying pressure between these two boundary surfaces 12*a*, 14*a* and thereby wet a portion as large as possible of these two boundary surfaces 12*a*, 14*a*, then compressive forces A acting in the direction of the first boundary element 12 may be exerted at suitably selected points of application 21 on the second boundary element 14. As a result, the medium 15 is displaced and distributed between the two boundary surfaces 12*a*, 14*a*. At the same time, however, this generates a pressure within the medium 15 resulting in a first compressive force F1 acting on the first limiting surface 12*a* in a direction away from the second limiting surface 14*a*, and in a second compressive force F2 opposing the first compressive force F1 and acting on the second boundary surface 14*a*.

Figure 2:
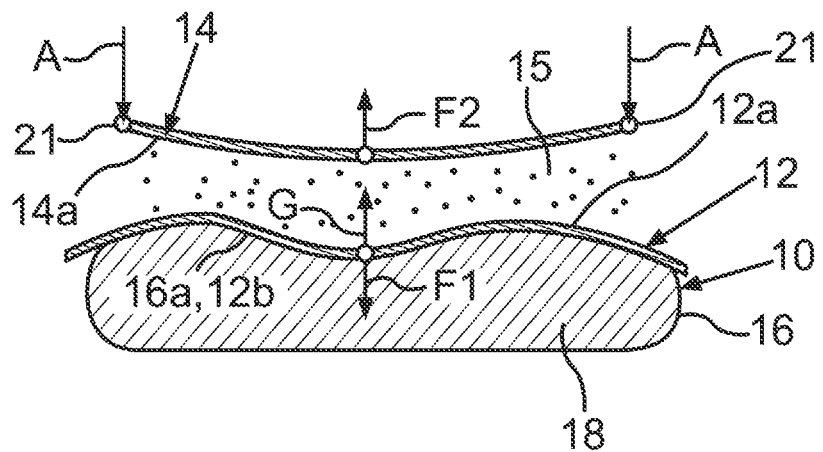
FIG. 2 is a schematic representation of the counterholder of FIG. 1 in a position supporting the first boundary surface, according to an embodiment of the invention.

Since the counterholder 10 for supporting the first boundary surface 12*a* is arranged on the contact side 12*b* of the boundary element 12, this counterholder 10 can now advantageously provide a counterforce G opposing this first compressive force F1, which also acts on the boundary element 12 and thus prevents a deformation of the boundary element 12 or at least significantly reduces its extent, when compared with other methods. This is now advantageously possible since, due to the high temporal change in the shear of the fluid 18, the viscosity of this fluid 18 increases sharply, in particular since this fluid 18 hardens or solidifies, and thus has the same structural strength as a rigid solid, which is illustrated in FIG. 2 by the hatched representation of the fluid 18. In particular, this can be achieved in a simple manner by applying the contact forces A as abruptly as possible at the second boundary element 14, whereby the resulting compressive forces F1, F2 also increase to their maximum value within a short period, which causes a high temporal change of shear forces acting within the fluid 18, thus giving rise to the abrupt viscosity increase of the fluid 18.

Figure 3:
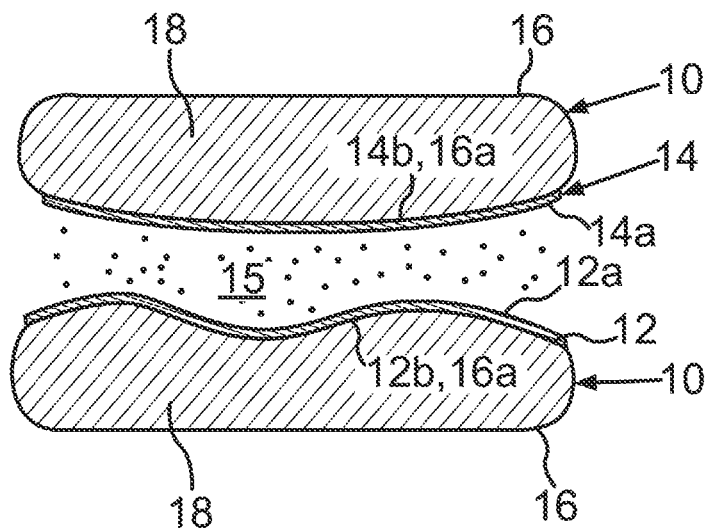
FIG. 3 is a schematic representation of two counterholders according to embodiments of the invention for supporting a first of two boundary surfaces, between which a medium is arranged.

If, for example, a support for the other boundary surface 14*a* also needs to be provided, it can be done in very much the same way by means of a further counterholder 10, as shown, e.g., in FIG. 3.

In this example, another counterholder 10 is now arranged on a second contact side 14*b*, which is arranged opposite the second boundary surface 14*a* of the second boundary element 14, and likewise provided by the second boundary element 14. As illustrated in FIG. 1, this further counterholder 10 was likewise slowly advanced toward this second contact side 14*b*, allowing the contact area 16*a* of the shell 16 to be optimally adapted to the surface geometries of this second contact side 14*b*, due to the low viscosity of the thus enveloped fluid 18 in this state, and thus may optimally support the second boundary surface 14*a*.

Altogether, the examples show how the invention can provide an automatically forming counterholder that conforms to the toleranced surfaces and causes no additional deformations. For this purpose, the counterholder is advantageously implemented with a bladder filled with a non-Newtonian fluid. By slowly moving the bladder toward the surface to be supported, the bladder may thus adhere to this surface and optimally adapt to the tolerance position. When initiating a force in the displacement process, the bladder hardens and prevents deformation of the supported surface. Thus, it can advantageously be ensured that no retraction [?] occurs even after the counterholder has been removed. The liquid or the medium, in general, is displaced and maximum wetting without overfilling may be achieved. This makes it possible to set a minimum gap between two boundary surfaces without these boundary surfaces being brought out of their tolerance position and without subsequently changing the wetting due to springback.

The invention claimed is:

1. A counterholder comprising:
a shell that is elastically deformable design at least in at least one contact area at a contact side opposite a first boundary surface of a cooling plate, wherein a medium is a gap filler between the cooling plate and a second boundary surface of a battery module, and the medium is a non-Newtonian, shear-thickening fluid.

2. The counterholder according to claim 1, wherein the shell is completely filled with the non-Newtonian fluid.

3. The counterholder according to claim 1, wherein when the counterholder is arranged in a preset slow manner on the contact side, a surface shape of the contact area may be adapted to a surface shape of the contact side, and at a preset rapid increase of the first compressive force to its maximum value upon initiation of a distribution process for distributing the medium between the first and second boundary surfaces, the non-Newtonian fluid at least temporarily solidifies.

4. The counterholder according to claim 1, wherein the non-Newtonian fluid is a reversibly dilatant fluid.

5. The counterholder according to claim 2, wherein, when the counterholder is arranged in a preset slow manner on the contact side, a surface shape of the contact area may be adapted to a surface shape of the contact side, and at a preset rapid increase of the first compressive force to its maximum value upon initiation of a distribution process for distributing the medium between the first and second boundary surfaces, the non-Newtonian fluid at least temporarily solidifies.

6. The counterholder according to claim 2, wherein the non-Newtonian fluid is a reversibly dilatant fluid.

7. The counterholder according to claim 3, wherein the non-Newtonian fluid is a reversibly dilatant fluid.

* * * * *